United States Patent Office 3,378,597
Patented Apr. 16, 1968

3,378,597
METHOD OF RECOVERING HIGH PURITY ETHYLENE DICHLORIDE FROM ETHYLENE DICHLORIDE GAS STREAM
Frederick C. Dehn, New Martinsville, W. Va., and William L. Deppe, Wilmington, Del., assignors to Pittsburgh Plate Glass Company, Pittsburgh, Pa., a corporation of Pennsylvania
No Drawing. Continuation of application Ser. No. 182,959, Mar. 27, 1962. This application Apr. 22, 1966, Ser. No. 544,393
9 Claims. (Cl. 260—652)

ABSTRACT OF THE DISCLOSURE

Process for recovering high purity ethylene dichloride from gas streams of ethylene dichloride containing HCl, water and chloral is provided wherein gas streams are condensed to form an organic and an inorganic liquid phase. The phases are separated and the organic phase, which contains ethylene dichloride and chloral components of the gas stream, treated with aqueous hydroxide to decompose the chloral to chloroform and formate. Alkali metal hydroxides are specifically disclosed as the preferred alkali hydroxides. Temperatures of 50 to 150° F. are disclosed and concentrations of hydroxide are maintained below those which would decompose the ethylene dichloride, typical range being 5 to 20 percent by weight.

---

This application is a continuation of our copending application U.S. Ser. No. 182,959, filed Mar. 27, 1962, now abandoned.

The present invention relates to the production of ethylene dichloride. More particularly, the present invention relates to the recovery of ethylene dichloride containing streams produced by the oxychlorination of ethylene.

Ethylene dichloride (1,2-dichloroethane) may be produced by the oxychlorination of ethylene in a fluidized bed reactor to produce gas streams predominating in ethylene dichloride. Oxychlorination procedures of this type involve modified Deacon type reactions in which hydrogen chloride is utilized as the source of chlorine for the chlorination of the ethylene feed. It is hypothesized that in oxychlorination procedures of this type hydrogen chloride fed to an oxychlorination catalyst reaction zone is oxidized in the presence of air or oxygen to chlorine and water and that the chlorine reacts with the ethylene feed material to produce the desired ethylene dichloride (1,2-dichloroethane) product.

When an oxychlorination reaction is conducted to produce ethylene dichloride from ethylene, extremely good yields of ethylene dichloride are produced at moderate reaction conditions. However, in the production of ethylene dichloride by this oxychlorination route, the product is typically contaminated by chloral. Chloral, present in ethylene dichloride in contaminating quantities (quantities in excess of 0.2 percent by weight), either as chloral or chloral hydrate presents a serious problem when distillation of the ethylene dichloride crude product streams is attempted. Since chloral and/or chloral hydrate boil very close to ethylene dichloride when either or both are present in an ethylene dichloride stream in contaminating quantities, distillation of such stream to produce a high purity ethylene dichloride is an extremely difficult and costly operation.

By virtue of the present process, ethylene dichloride contained in product streams produced by the oxychlorination reaction of ethylene, chlorine and/or HCl and an oxygen containing gas, is readily separated from any chloral present therein in contaminating quantities; and, thus, by normal distillation procedures ethylene dichloride of high purity may be readily obtained from these product streams without recourse to any expensive distillation equipment. Thus, in accordance with the present invention, ethylene dichloride having contaminating quantities of chloral present therein, is introduced into a scrubbing zone where it is contacted or scrubbed at moderate temperatures with an aqueous solution of a hydroxide of the group consisting of alkali metal hydroxides and ammonium hydroxide. By virtue of this contact with an aqueous solution of alkali metal hydroxide at moderate temperatures, the ethylene dichloride contaminated stream is reacted upon by the alkali metal hydroxide and sodium formate is formed along with chloroform in accordance with either or both of the following equations, depending on whether the contaminant is present as chloral or as chloral hydrate or as both.

(1) 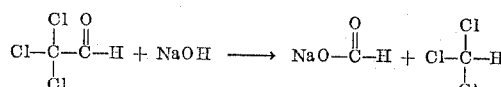

(2) 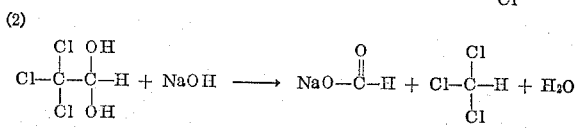

The ethylene dichloride stream, thus treated, may then be readily distilled in conventional distillation equipment by simple fractionation to remove the ethylene dichloride in a state of high purity and substantially free of chloral either as chloral or in the hydrated form.

It is well known in the prior art that ethylene dichloride in the presence of alkali metal hydroxide solutions may readily be dehydrochlorinated to produce vinyl chloride in accordance with the following equation:

(3) 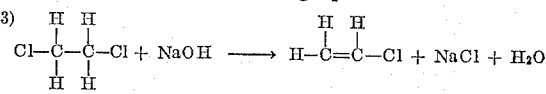

Thus, such procedures are described in U.S. Patent 2,539,307 granted June 23, 1951, and U.S. Patent 2,041,814. By virtue of the present process, it is surprising that the chloral content of an ethylene dichloride stream can be essentially removed by treatment with an alkali metal hydroxide solution at moderate temperatures and without the concurrent production of vinyl chloride. During the contact of the aqueous alkali metal hydroxide solutions with ethylene dichloride, in accordance with the teachings of this invention, essentially no vinyl chloride is produced as would be expected from Equation 3.

Thus, it has been found in accordance with this invention that ethylene dichloride containing contaminating quantities of chloral may be contacted with an aqueous solution of alkali metal hydroxide, preferably sodium hydroxide having a concentration in the range of between 5 and 20 percent alkali metal hydroxide by weight. During the period of contact between the contaminated ethylene dichloride streams and the alkali metal hydroxide solutions temperatures are maintained in the range of between 50° F. and 150° F. It is important in operating the contact or purification system in accordance with this invention, that strict adherence to the temperature limitations set forth be maintained, for operation at temperatures outside of the range, that is, more elevated temperatures, give rise to a cracking of the ethylene dichloride to vinyl chloride and the consequent loss of ethylene dichloride product. By maintaining alkali metal hydroxide concentrations within the prescribed limits and the temperatures within the range as above set forth during the contact of the contaminated ethylene dichloride and the alkali metal hydroxide solutions, satisfactory reduction of the chloral content of the ethylene dichloride takes place and no production of vinyl chloride ensues.

Organic product recovered from the alkali metal hydroxide contact zone is preferably passed to a dehydration still prior to admission to the final product distillation column. Thus, ethylene dichloride, after having been treated with the alkali metal hydroxide solutions to remove the chloral contained therein, is passed to a dehydration still to remove the water content of the organic stream. Typical in the dehydration still water is removed as overhead and the organic material is passed as bottoms to a distillation column where ethylene dichloride product is removed as high purity ethylene dichloride overhead.

In conducting the oxychlorination reactions which produce the ethylene dichloride streams containing chloral in accordance with this invention, recourse to procedures such as those described in copending application Ser. No. 110,360, filed May 16, 1961, now abandoned, may be had. While the methods shown in said copending application may be readily employed to produce the ethylene dichloride stream, which will ultimately contain small quantities of chloral, that is, quantities representing between 0.2 and 3 percent by weight of the chlorinated hydrocarbon stream, recourse to other oxychlorination methods is also possible. Thus, fixed bed processes may be readily used and process conditions other than those shown in said application may be employed.

In a preferred embodiment of the present invention, sodium hydroxide solutions are employed in the chloral removal step and are typically employed in concentrations in the range of 5 to 20 percent sodium hydroxide by weight preferably 8 to 15 percent by weight. The temperature of the contact or purification zone where the sodium hydroxide is contacted with the ethylene dichloride contaminated liquid body is operated at temperatures of between 50° F. and 150° F. and preferably in the temperature range of between 100° F. to 120° F. Also in the preferred embodiment of the present invention, a packed contact tower containing materials such as Raschig rings is employed to insure adequate contact of the ethylene dichloride and caustic soda. While a packed column is preferred, it is also permissible to employ sieve tray columns, bubble cap towers and other similar conventional liquid-liquid contact apparatus.

In the preferred method of operating such a system aqueous sodium hydroxide is fed to the bottom of the contact column or scrubber and the contaminated ethylene dichloride is showered down through the column while the sodium hydroxide is introduced upwardly therein. In this manner an organic body of ethylene dichloride is removed as the bottoms product from the contact tower while the aqueous sodium hydroxide phase is removed overhead, both liquid bodies countercurrently contacting each other during passage through the columns. Operating in this manner, the chloroform generated by the reaction of the sodium hydroxide with the chloral is removed in the chlorinated organic body, while the sodium formate formed by the reaction is soluble in the aqueous caustic solution and is removed in the overhead aqueous stream from this column.

For a more complete understanding of the present invention, reference is made to one of the modes of operating the process of the present invention. A liquid stream of ethylene dichloride contaminated with chloral typically from 0.5 to 0.9 percent by weight is introduced into a caustic scrubbing column having contained therein packing of 1 inch Raschig rings made out of porcelain. An aqueous caustic soda solution is introduced into the column at the bottom portion of the packing and passes upwardly in the column in countercurrent contact with the downwardly flowing chlorinated hydrocarbon stream. The organic material is removed from the column and is passed to a dehydration still, which is operated at a top temperature of 175° F. and a bottom temperature of 190° F. The overhead of the dehydration still which contains water and organics, is removed, condensed, and phase separated. The organic phase of the dehydration still is utilized as a refluxing liquid in the upper portion of the column. The bottoms from the dehydration still are introduced then to a conventional distillation column operated at temperature and pressure conditions sufficient to provide an ethylene dichloride overhead.

For a more complete understanding of the invention, the following examples are illustrative of certain modes which may be employed in conducting the process.

EXAMPLE I

A catalyst containing aqueous solution was prepared by dissolving 29 pounds of $CuCl_2 \cdot 2H_2O$ and 15.2 pounds of KCl in 5.3 gallons of distilled water. A 10-inch internal diameter reactor was charged with 100 pounds of 30 to 60 mesh (U.S. Sieve Series) Florex (a calcined fuller's earth sold by the Floridin Corporation). The Florex particles were fluidized in the reactor by blowing hot air up through the 100 pound bed of particles at a superficial velocity of 0.5 foot per second. The temperature of the bed was maintained at 220° F. and the catalyst containing solution was added to the bed dropwise until the entire 5.3 gallons of solution had been added. The reactor was shut down when the water of solution of the catalyst solution no longer came off the reactor as overhead. The finished catalyst contained 7.5 weight percent copper and 5.5 weight percent potassium.

EXAMPLE II

A nickel reactor 8 feet in height and 15 inches in diameter was employed as a fluid bed oxychlorination reactor. The reactor was enclosed in a 20-inch diameter steel jacket forming an annular heat exchange system in which a heat transfer medium, Dowtherm (a diphenyl-diphenyl oxide eutectic), was used to heat and cool the fluid bed. An 8-inch diameter nickel cyclone was located in the top of the reactor on the inside. Located in the bottom of the reactor was a nickel distributor plate having a plurality of drilled holes. Below the distributor plate was a wind box or chamber closed at the sides and bottom which served as an introduction chamber for the reactant feed gases. The feed gases were introduced into this chamber and passed through the drilled holes to the bed of catalysts.

The reactor was filled to a depth of 6 feet with catalyst particles prepared as described in Example I. These gas feed lines were provided for the introduction of oxygen, ethylene and chlorine and/or HCl to the wind box. A cooling coil consisting of 50 feet of ½ inch nickel pipe was placed in the fluid bed at a point about 8 inches above the distributor plate and extending upwardly approximately 6 feet 6 inches. Water under 30 pounds per square inch pressure was circulated through the coil to remove heat generated by the reaction taking place in the fluid bed.

Using this apparatus ethylene, HCl and oxygen were fed to the reactor in a molar ratio of ethylene to HCl to oxygen of 1.0 to 2.03 to 0.58. The temperature of the reactor was maintained at 550° F. and a bed velocity of 0.6 foot per second was maintained. Product gases from the reactor were passed through a shell and tube heat exchanger and the organic product was condensed. The condensed liquid was then passed to a phase separator where the organic crude was separated from the water and HCl present. Operating in this manner an ethylene dichloride crude having a purity of 95.5 percent ethylene dichloride was obtained at utilization of ethylene and HCl of 93.4 and 93.9 percent respectively.

The organic product, which was predominantly ethylene dichloride, contained about 0.5 percent chloral ($CCl_3CHO$) by weight therein. This chloral contaminated ethylene dichloride crude was then passed into the top of a 4-inch internal diameter glass column about 12 feet in height and containing a 10-foot section of packing. The packing consisted of ¼ inch ceramic Raschig rings and the column was maintained flooded with a 10 percent by weight aqueous sodium hydroxide solution as a continuous phase. The caustic being fed at the bottom and removed at the top at a point above the packing. Ethylene dichloride crude passed into the top of the column was removed at the bottom, dried in a dehydration still column and fractionated in a second still. During the contact, the temperature of the column was maintained at 115° F. The ethylene dichloride product recovered had a purity of 99.5 percent. During the run, 14 pounds of NaOH was provided for each ton of crude ethylene dichloride passed to the caustic column. The caustic treated ethylene dichloride removed from the column contained only trace quantities of chloral (0.02 percent or less).

EXAMPLE III

Using the reactor of Example II ethylene, HCl and oxygen are reacted in a molar ratio of ethylene to HCl to oxygen of 1.0 to 2.03 to 0.58. The reactor temperature is maintained at about 550° F. and a bed velocity of 0.6 foot per second is employed. The product gases are condensed in a shell and tube heat exchanger and the resulting liquid product is phase separated into an organic phase and an aqueous phase. The organic phase is mainly ethylene dichloride (95 percent by weight) and contains about 0.5 percent chloral by weight.

This ethylene dichloride contaminated with chloral is then passed to the top of a 4-inch internal diameter glass column, 12 feet in height and having a 10-foot section of packing. The packing consists of ¼ inch ceramic Raschig rings. The column is flooded with a 10 percent by weight aqueous potassium hydroxide solution as a continuous phase. The potassium hydroxide is fed at the bottom of the column and is removed at the top above the packing. The ethylene dichloride contaminated with chloral is passed into the top of the column and is removed at the bottom. The temperature of the column is maintained at about 115° F. during contact. Operating in this manner the ethylene dichloride removed from the column contains only traces of chloral (0.02 percent or less).

EXAMPLE IV

Using the reactor of Example II, ethylene, HCl and oxygen are reacted in a molar ratio of ethylene to HCl to oxygen of 1.0 to 2.03 to 0.58. The reactor temperature is maintained at about 550° F. and a bed velocity of 0.6 foot per second is employed. The product gases are condensed in a shell and tube heat exchanger and the resulting liquid product is phase separated into an organic phase and an aqueous phase. The organic phase is mainly ethylene dichloride (95 percent by weight) and contains about 0.5 percent by weight chloral.

This ethylene dichloride contaminated with chloral is then passed to the top of a 4 inch internal diameter glass column, 12 feet in height and having a 10 foot section of packing. The packing consists of 1.4 inch ceramic Raschig rings. The column is flooded with a 10 percent by weight aqueous ammonium hydroxide fed at the bottom of the column and is removed at the top above the packing. The ethylene dichloride contaminated with chloral is passed into the top of the column and is removed at the bottom. The temperature of the column is maintained at about 100° F. during contact. Operating in this manner the ethylene dichloride is removed from the column and contains only traces of chloral (0.02 percent or less).

In discussing the operation of the column in which the chloral is removed, the hydroxide solutions formed the continuous phase. While this is the preferred mode of opeation it is, of course, also permissible to flood the column with the ethylene dichloride crude and use this as the continuous phase. In this modification, the hydroxide solutions are fed up through the column of crude organic.

Thus, while the invention has been described with reference to certain specific examples and preferred embodiments, it is not intended that it be so limited except insofar as appears in the accompanying claims.

We claim:
1. A method of recovering high purity ethylene dichloride from an ethylene dichloride gas stream containing water, HCl, and contaminating quantities of chloral comprising condensing said stream to liquefy said ethylene dichloride, water, HCl, and chloral to form an aqueous phase containing said water and HCl and an organic liquid phase containing said ethylene dichloride and chloral, separating said aqueous phase containing water and HCl from said organic liquid phase containing ethylene dichloride and chloral, contacting said separated ethylene dichloride and cloral with an aqueous solution of an hydroxide of the group consisting of alkali metal hydroxide and ammonium hydroxide, said hydroxide concentration being between 5 and 20 percent by weight, maintaining the temperature at between 50 and 150° F. during said contact and separating the ethylene dichloride stream after said contact to recover said ethylene dichloride substantially free of chloral.

2. A method of recovering high purity ethylene dichloride from a stream of liquid containing water and HCl in an aqueous phase and ethylene dichloride and contaminating quantities of chloral in an organic liquid phase comprising, separating said aqueous phase containing water and HCl from said organic liquid phase containing ethylene dichloride and chloral to provide a remaining stream of ethylene dichloride containing contaminating quantities of chloral, introducing said remaining contaminated stream into a column and contacting said remaining stream with a countercurrent flow of an aqueous solution of a hydroxide of the group consisting of alkali metal hydroxides and ammonium hydroxides, said aqueous solution of hydroxide being present in a quantity sufficient to maintain the aqueous solution as a continuous phase in the column, maintaining the temperature of said hydroxide between 100° F. and 120° F. during said contact and the concentration of said hydroxide between 8 and 15 percent by weight, removing the ethylene dichloride from the column in a stream separate from the aqueous solution introduced into the column, removing the water from the ethylene dichloride so removed from the column and recovering said ethylene dichloride substantially free from chloral.

3. The method of claim 1 wherein the alkali metal hydroxide employed is sodium hydroxide.

4. The method of claim 1 wherein the alkali metal hydroxide employed is potassium hydroxide.

5. The method of claim 1 wherein the hydroxide employed is ammonium hydroxide.

6. The method of claim 2 wherein the aqueous hydroxide employed is sodium hydroxide.

7. The method of claim 2 wherein the aqueous hydroxide employed is potassium hydroxide.

8. The method of claim 2 wherein the aqueous hydroxide employed is ammonium hydroxide.

9. A method of recovering high purity ethylene dichloride from an ethylene dichloride gas stream containing water, HCl and contaminating quantities of chloral comprising condensing said stream to liquefy said ethylene dichloride, water, HCl and chloral to form an aqueous phase containing water and HCl and an organic liquid phase containing ethylene dichloride and chloral, separating said aqueous phase containing water and HCl from said organic liquid phase containing ethylene dichloride and chloral, contacting said separated ethylene dichloride and chloral with an aqueous solution of a hydroxide of the group consisting of alkali metal hydroxide and ammonium hydroxide, maintaining the hydroxide concentration and temperature below that at which ethylene dichloride cracks, said temperature being within the range 50° to 150° F. whereby to convert the chloral to formate and chloroform while avoiding vinyl chloride formation, separating ethylene dichloride after said contact to recover ethylene dichloride substantially free of chloral.

References Cited

UNITED STATES PATENTS

| | | | |
|---|---|---|---|
| 2,041,814 | 5/1936 | Brous | 260—656 X |
| 2,356,785 | 8/1944 | Hammond | 260—660 X |
| 2,746,844 | 5/1956 | Johnson et al. | 260—659 X |
| 3,042,728 | 7/1962 | Hirsh et al. | 260—659 X |

OTHER REFERENCES

McKinney et al.: J. Org. Food Chem., vol. 3, No. 5, 1955, pp. 413–419.

Norris: Organic Chemistry, McGraw-Hill Book Co., New York, 2nd Ed. (1922) p. 314.

LEON ZITVER, *Primary Examiner.*

H. MARS, *Assistant Examiner.*